(12) United States Patent
Abernethy et al.

(10) Patent No.: US 8,793,191 B2
(45) Date of Patent: Jul. 29, 2014

(54) SYSTEM AND METHOD FOR DUPLICATE DETECTION

(75) Inventors: George Miller Abernethy, Charlotte, NC (US); Melinda Hiler, Ennis, TX (US); Dave Wellington McMann, Garland, TX (US); Steve David Poinier, Corinth, TX (US); Geoffrey Reed Williams, Mansfield, TX (US)

(73) Assignee: Bank of America Corporation, Charlotte, NC (US)

( * ) Notice: Subject to any disclaimer, the term of this patent is extended or adjusted under 35 U.S.C. 154(b) by 1457 days.

(21) Appl. No.: 11/555,444

(22) Filed: Nov. 1, 2006

(65) Prior Publication Data

US 2008/0103790 A1    May 1, 2008

(51) Int. Cl.
*G06Q 40/00* (2012.01)
*G06Q 20/04* (2012.01)

(52) U.S. Cl.
CPC ............. *G06Q 40/00* (2013.01); *G06Q 20/042* (2013.01)
USPC .............................................. 705/45; 705/35

(58) Field of Classification Search
USPC .................................................... 705/35, 45
See application file for complete search history.

(56) References Cited

U.S. PATENT DOCUMENTS

| 6,295,522 | B1 |   | 9/2001 | Boesch |   |
|---|---|---|---|---|---|
| 7,003,494 | B2 | * | 2/2006 | Beach et al. | 705/40 |
| 7,028,886 | B1 | * | 4/2006 | Maloney | 235/375 |
| 2002/0194174 | A1 |   | 12/2002 | Calkins et al. |   |
| 2002/0198860 | A1 |   | 12/2002 | Smith |   |
| 2003/0172066 | A1 | * | 9/2003 | Cooper et al. | 707/7 |
| 2004/0107205 | A1 |   | 6/2004 | Burdick et al. |   |
| 2005/0108168 | A1 |   | 5/2005 | Halpin et al. |   |
| 2006/0229987 | A1 | * | 10/2006 | Leekley | 705/45 |

OTHER PUBLICATIONS

Carsten A.W. Paasch; "Credit Card Fraud detection using artificial Neural Networks tuned by Genetic Algorithms"; Hong Kong; Feb. 2008.*
Sisk, Michael; "Check Duplication Vexation: In wake of Check 21, banks spends millions to fix duplicate checks"; Bank Technology News; Sep. 2008.*
International Preliminary Report on Patentability for International Application No. PCT/US2007/083314, issued May 5, 2009, 5 pages.
International Search Report and Written Opinion for International Application No. PCT/US07/83314, mailed Sep. 23, 2008, 8 pages.
Non-final office action for U.S. Appl. No. 12/362,833 mailed Nov. 26, 2010.
Final office action for U.S. Appl. No. 12/362,833 mailed May 11, 2011.
Notice of Allowance for U.S. Appl. No. 12/362,833 mailed Sep. 11, 2013.

* cited by examiner

*Primary Examiner* — Lalita M Hamilton
*Assistant Examiner* — Edward Chang
(74) *Attorney, Agent, or Firm* — Banner & Witcoff, Ltd.; Michael A. Springs

(57) ABSTRACT

A duplicate detection system is provided for analyzing and processing documents received at one or more capture sites. A physical document may be electronically captured at a capture site and subsequently transmitted to a regional or central processing system. The regional or central processing system may receive capture documents from multiple capture sites. The processing system may analyze the captured documents to identify and flag false-positives prior to performing duplicate detection. Duplicate detection may be performed in accordance with predefined rules associated with false-positive flags. Once duplicate detection is complete, suspected duplicates may undergo manual review while non-duplicates are released for posting or dispatching.

22 Claims, 6 Drawing Sheets

SYSTEM AND METHOD FOR DUPLICATE DETECTION

BACKGROUND

The efficiency and speed with which financial processes are performed often have substantial impacts on a company's operating costs and profits. Customers may also be drawn to financial companies that are able to perform transactions more expediently than others. For example, the speed with which checks are deposited and reflected in a customer's account may affect a customer's satisfaction with the financial institution. More efficient processing of financial transactions may further prevent financial irregularities in the bank's accounting ledger and/or transaction log.

One area in which financial institutions may encounter operational delays is duplicate detection and processing. With the advent of electronic banking and electronic processing of financial transactions, duplicate detection is often needed to prevent double processing of the same financial document or transaction. However, current electronic duplicate detection system may be over inclusive and flag non-duplicate documents as duplicate items. For example, rebate checks having the same check number and deposited by multiple customers of the same banking institution may be flagged as a duplicate document or item. In another example, a returned check may also be erroneously labeled as a duplicate item based on the same micr line information and/or check number. As such, false-positives may create significant delays in the processing of various transactions.

Additionally, current financial transactions are generally processed locally at each banking site (e.g., local bank branch, automated teller machine (ATM)). Thus, when the local banking site closes, the processing of financial transactions are also generally shut down for the day. This produces significant delays in the completion of transactions that are not entered in time to be processed the same day. Further, since financial documents are processed locally, duplicates submitted at different bank branches or sites often go undetected.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

A regional or central duplicate detection system allows local capture sites such as local branches and ATMs to submit captured documents for review and processing. For example, a check deposited at a local ATM may be scanned into electronic format and forwarded to a regional processing center. By processing documents regionally, the scope of duplicate detection is expanded and consequently, the accuracy of duplicate detection may also be enhanced. A reformatter system at the regional processing center may initially determine whether the check should be flagged as a false-positive. This determination may be made based on predefined rules and preferences. If the check constitutes a false-positive, the check may be flagged and forwarded to a duplicate detection system. Flagging potential false-positive documents may reduce the over inclusiveness of duplicate detection systems. The duplicate detection system may then evaluate the check to determine whether or not the check is a duplicate. If the check is flagged as a false-positive, the duplicate detection system may then apply different duplicate detection rules than if the check were not flagged. Duplicates and non-duplicates may subsequently be transferred back to the reformatter system. The non-duplicates may be released for posting or dispatching while the duplicates may be submitted to a manual review system. For example, partner non-duplicate documents may be dispatched as an image cash letter to the responsible financial institution while on-us non-duplicate documents may be posted for internal reconciliation and processing.

In one or more aspects, suspected duplicate documents identified by the duplicate detection system may be forwarded by the reformatter system to a review system. The review system may distribute suspected duplicates to one or more workstations. Personnel at the workstations may then manually review the suspected duplicate item and the alleged original item to determine whether or not the suspect duplicate is a true duplicate or a false positive. If the suspect duplicate is a true duplicate, the duplicate may be charged to a general ledger suspense account and further evaluated by a research and adjustments department. If, however, the suspect duplicate is a false-positive, the suspect duplicate may be flagged appropriately and re-processed.

According to another aspect, multiple false-positive flags may be defined corresponding to different levels of evaluation of the duplicate detection system. That is, a first false-positive flag may instruct the duplicate detection system to identify a flagged false-positive as a duplicate if the document includes the same micr line as another document. A second false-positive flag, however, may indicate to the duplicate detection system that a document flagged with the second false-positive flag is not a duplicate, even if the item sequence number matches that of another document.

According to yet another aspect, a regional processing system may separate out suspected duplicates and non-duplicates so that non-duplicates may be processed, dispatched, and/or posted without having to wait for resolution of the suspected duplicates. In addition, regional processing allows financial transactions to be processed independent of a local capture site's hours of operation. As such, even when a local capture site (e.g., a local bank branch) has closed, the transaction documents captured at the site may still be processed.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
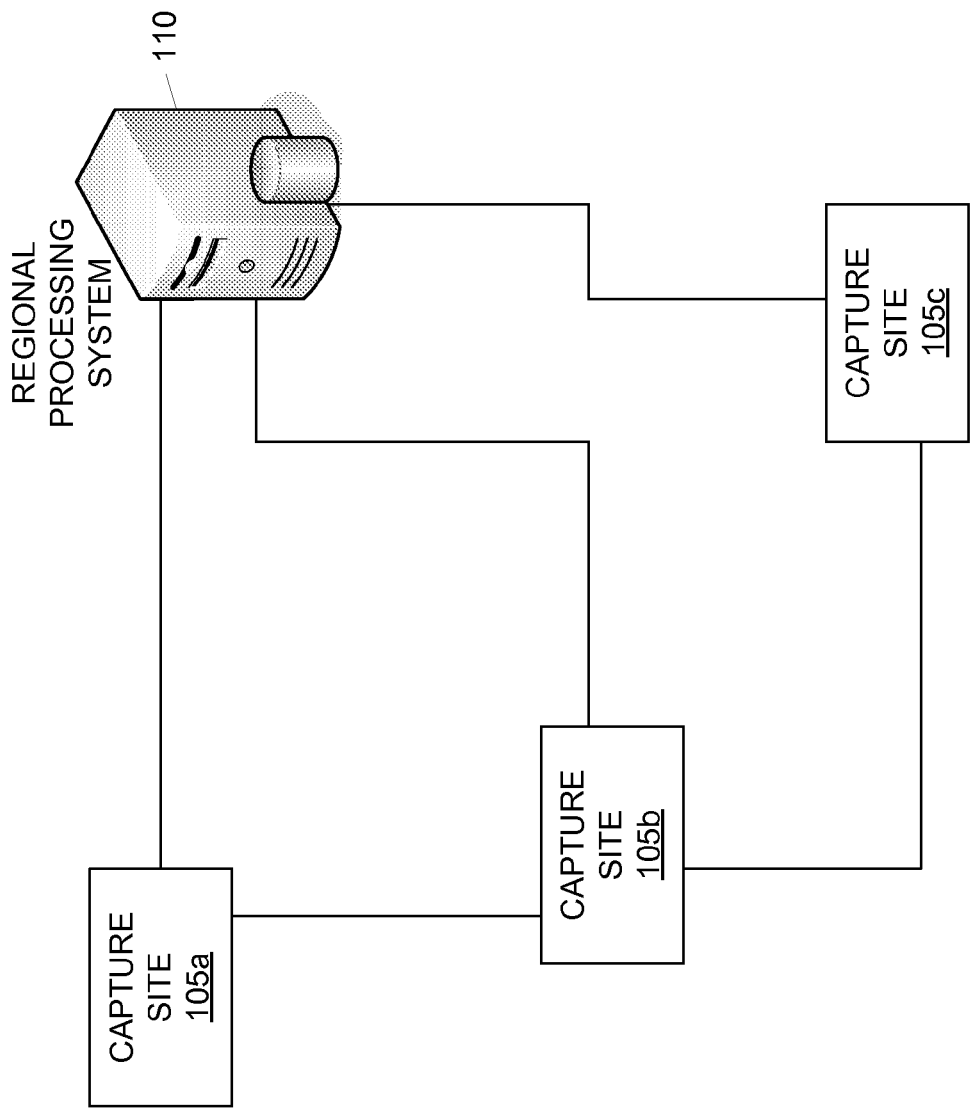
FIG. 1 illustrates a document processing and review system according to one or more aspects described herein.

FIG. 1 illustrates a document processing and review system including multiple document capture sites 105 and duplicate detection server 110. Duplicate detection server 110 is connected to each of document capture sites 105a, 105b and 105c such that documents captured at sites 105 may be transmitted to and processed by a central system. In the banking industry, for example, duplicate detection may be performed for documents like deposit and withdrawal slips, checks and fund transfer documents so that the same documents are not processed twice. In addition, by using a central detection server such as server 110, duplicates may be detected across multiple capture sites, e.g., 105a and 105b. In one or more configurations, each of document capture sites 105a, 105b and 105c may be remotely located from one another. In addition, detection server 110 may also be remotely located from each of capture sites 105a, 105 and 105c. To facilitate communications such as the transfer of digital documents, the sites 105a, 105b and 105c may each be connected to duplicate detection server 100 through a wired or wireless network. Various networking protocols that may be used to facilitate such a system may include local area networks (LANs), wireless local area networks (WLANs), cellular networks and/or combinations thereof. Encryption such as SSL and the like may also be used to enhance the data transfer security of documents like financial transaction records, receipts and ledgers.

Document capture sites 105 may include various facilities and systems including local bank branches, automated teller machines (ATMs), and local capturing and/or processing sites. In one example, a check deposited by a bank customer at his or her local branch may be scanned by a document scanning system or device at the local branch. The scanned image of the document may undergo further processing within the local branch (e.g., adding to a transaction log, sorting, and the like) and/or may be routed to another facility like detection server 110 for processing. In one or more configurations, a local capture site such as capture site 105b, may further be connected to an intermediate facility or site (not shown). The intermediate facility or system may be used to perform various processes on documents captured by site 105b prior to transmitting the document to detection server 110. Captures sites 105 may also be connected to one another allowing each site 105a, 105b and 105c to communicate with each other. For example, if a problem arises in the connection between site 105a and server 110, site 105a may still communicate documents or other information to server 110 through site 105b or 105c.

Duplicate detection server 110 is configured to perform duplicate detection on documents captured by multiple capture sites 105. Capture sites 105 may be sites located within a particular region. As such, duplicate detection server 110 may be responsible for a particular region of capture sites while other detection servers (not shown) may be used by other regions. Regions may be defined based on a variety of factors, including physical location, processing load and/or hours of operation. For example, capture sites 105 may be divided into regions in a manner that evenly distributes the processing load among multiple detection servers. Connections between sites 105 and server 110 may further support two-way communications so that server 110 may provide data to sites 105.

Figure 2:
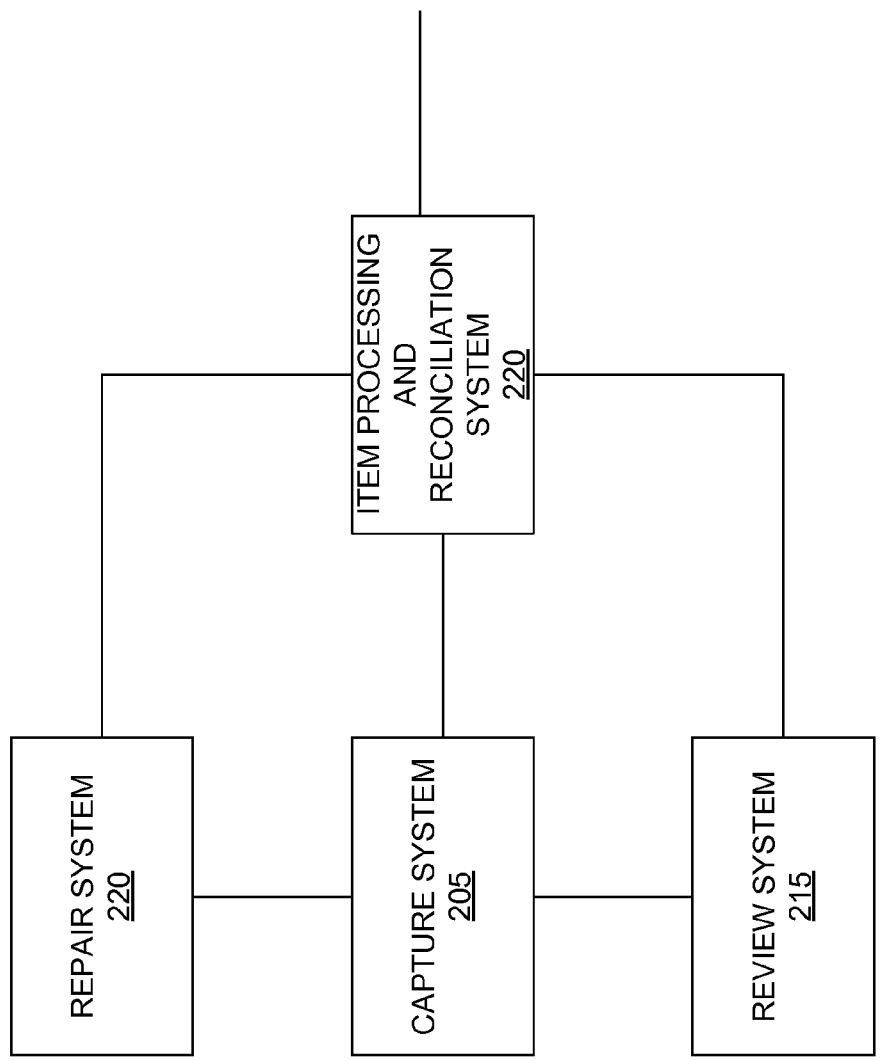
FIG. 2 illustrates a block diagram of systems and components of a capture site according to one or more aspects described herein.

FIG. 2 illustrates a block diagram of systems and components of a capture site such as site 105a of FIG. 1. The systems and components of the capture may include document capture system 205 that is configured to convert physical documents into electronic document images. For example, document capture system 205 may include a scanner whereby the image of a physical document may be captured electronically. Document capture system 205 may further include character or pattern recognition functionality so that captured documents may be categorized and/or otherwise processed based on content. Capture system 205 may also index the captured document by assigning each document with an identification number or mark.

The capture site may also include document or image repair system 210, document review system 215 and an item processing and reconciliation system 220. Repair system 210 may be used to repair documents that cannot be processed due to various reasons including poor image capture quality and invalid or unrecognized document types. Repair system 210 may repair documents automatically by, e.g., improving image quality using image processing techniques. Repair system 210 may also forward rejected documents to a user for manual review and repair. In one or more configurations, rejected or questionable documents may be submitted to document review system 215 where a user may manually review and analyze the rejected document. For example, document review system 210 may include a server that distributes rejected documents to one or more workstations where review personnel are stationed. Each of capture system 205, repair system 210 and document review system 210 is further connected to item processing and reconciliation system 220 which is configured to collect documents captured through the capture site, process the document according to one or more predefined tasks and to reconcile information contained within the captured documents. For example, documents received through the capture site may be parsed for information such as whether or not the document reflects a deposit or a withdrawal and an amount associated therewith. Accordingly, item processing and reconciliation system 220 may insure that deposits and withdrawals are reconciled in a ledger or other transaction log for the capture site. Processing and reconciliation system 220 may also prepare documents to be transmitted to a regional processing site such as duplicate detection server 110 of FIG. 1. In one example, documents may be converted to a uniform format and/or combined into a single file for transmission.

Figure 3:
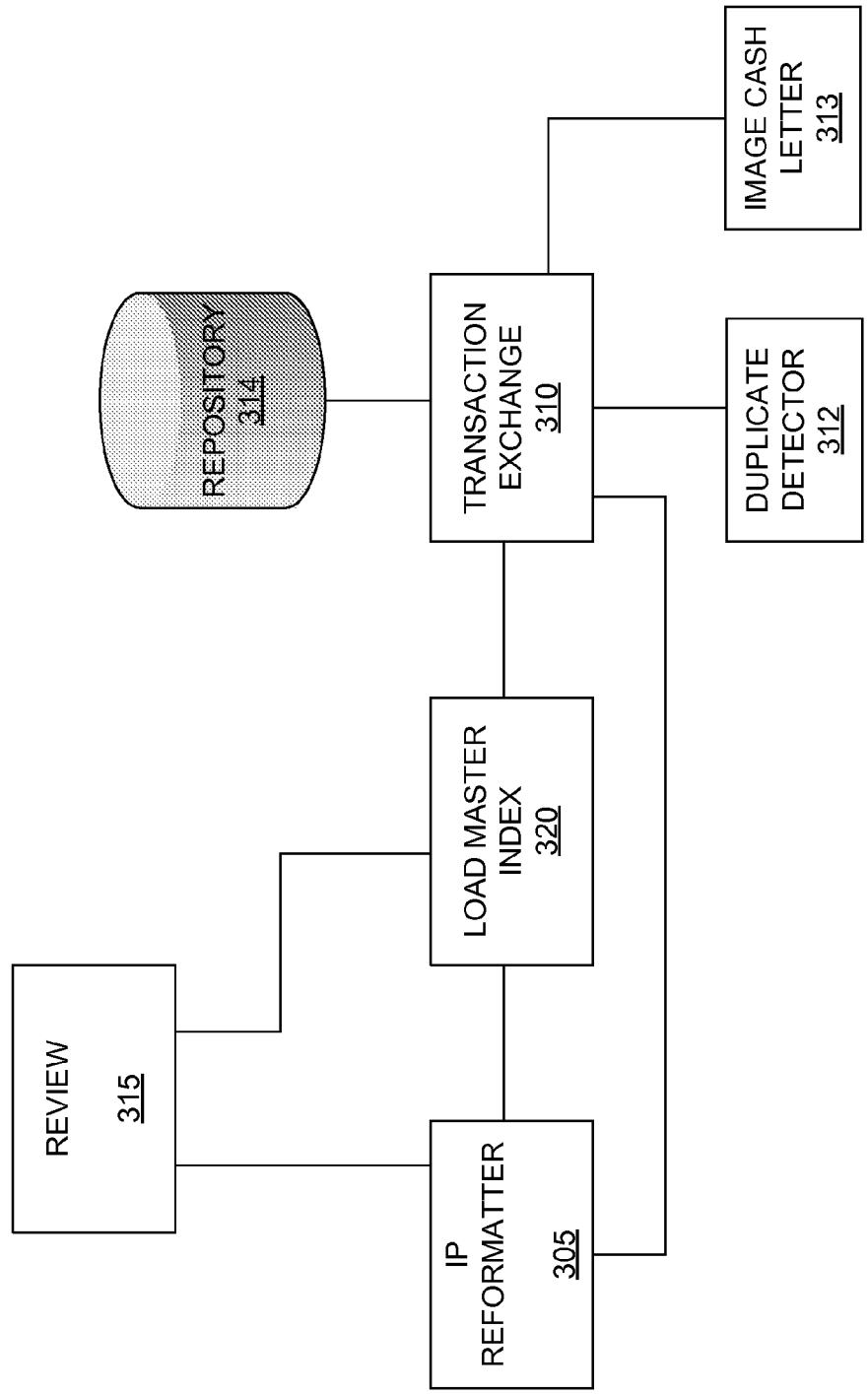
FIG. 3 illustrates a block diagram of systems and components of a regional document processing system according to one or more aspects described herein.

Documents captured and processed by a capture site are subsequently transmitted to a regional or central duplicate detection and processing server. FIG. 3 illustrates a block diagram of systems and components of a duplicate detection and processing server (e.g., duplicate detection server 110 of FIG. 1). The duplicate detection server may include systems such as Item Processing (IP) reformatter system 305, transaction exchange system 310, review system 315 and master index system 320. Transaction exchange system 310 may include a transaction duplicate detector subsystem 312 and an image cash letter subsystem 313. Initially, IP reformatter system 305 may receive a collection of document images from one or more capture sites like sites 105 (FIG. 1). Upon receipt of the document images, reformatter 305 may be configured to reformat the documents into a format specified by transaction exchange system 310. In addition, IP reformatter 305 may analyze each document to determine whether the document is a false-positive duplicate. In other words, transaction duplicate detector 312 may identify the document as a duplicate when the document is actually not a duplicate. False-positives may occur in a variety of instances including when an item (e.g., a check) is returned or when rebate checks are deposited (rebate checks may have the same check number). False-positives may also include re-clears and casino drafts. IP reformatter system 305 may be configured with rule that define conditions under which a document is to be flagged a false-positive duplicate.

Generally, IP reformatter 305 is connected to load master index system 320 which is configured to index documents passed from IP reformatter 305 to transaction exchange system 310. The index may be used to identify documents that are dispatched to other banks or companies through image cash letter subsystem 313. Once indexed, documents are then deposited in transaction exchange system 310 for collection and storage. Transaction exchange system 310 includes master repository 314 for storage of all document images that are sent to the regional or central duplicate detection server. In addition, transaction exchange system 310 is responsible for passing the documents to duplicate detection subsystem 312 and, if the documents have been cleared for dispatch, to image cash letter subsystem 313 or a posting system (not shown). According to one or more aspects, documents may be classified into partner items and on-us items for processing purposes. Partner items may refer to documents that are to be submitted to another bank or company for resolution (e.g., a check drawn on another bank). On-us items, on the other hand, generally relate to documents that are to be reconciled internally (e.g., withdrawal slips and line of credit documents). Additionally, duplicate detection subsystem 312 is connected to IP reformatter system 305 for further processing of detected duplicates.

IP reformatter system 305 may also be connected to duplicate review system 315, which facilitates the review and analysis of detected duplicates. Duplicate review system 315 may include a distribution server (not shown) that takes individual suspected duplicate documents and distributes them to one or more workstations. Review personnel at the workstations may then review the suspected duplicate documents and manually determine whether or not the documents are true duplicates or false-positives. In one or more configurations, review personnel may review and analyze suspect documents in electronic format rather than having to retrieve and evaluate paper copies. This may increase the speed and efficiency and reduce the cost of manual duplicate review processes.

Figure 4:
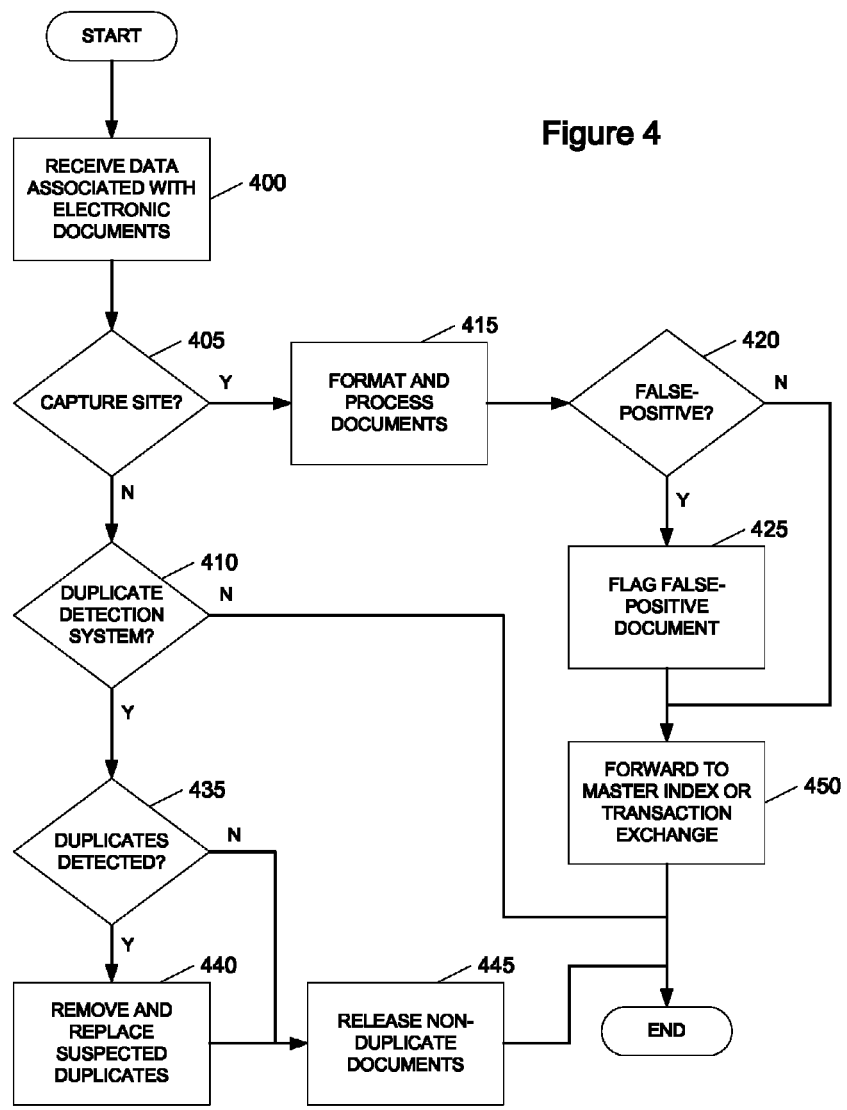
FIG. 4 is a flowchart illustrating a method for analyzing and processing received documents by a reformatter system according to one or more aspects described herein.

FIG. 4 is a flowchart illustrating a method for analyzing and processing documents received from capture sites. In step 400, a system such as reformatter 305 of FIG. 3 may receive a data associated with one or more electronic documents. The data may be received in the form of a single data file or separate files. In steps 405 and 410, the system determines whether the data corresponding to the one or more electronic documents was received from a capture site or from a duplicate detection system, respectively. If it is determined in step 405 that the electronic documents were received from a capture site, the system may format and process each document in step 415. Processing and formatting may include reformatting the document into a specified format and/or performing character and pattern recognition. In step 420, the system may determine whether or not a document is a false-positive. The determination may include identifying whether a document includes predefined characteristics associated with false-positive duplicates. For example, a rule may be defined in the system that associates a document having the word "Rebate" with a false-positive. In another example, documents that are identified as returned checks may automatically be flagged as false-positives.

In step 425, each document identified as a false positive may be flagged as such. False-positive flags may determine a manner in which the document is processed by a duplicate detection system. As such, different false-positive flags may be applied depending on the predefined rules. A rebate check may be flagged with a false-positive value of '3' that would cause the rebate check to be flagged as a duplicate only if the item sequence number of the check and a second document are the same. Other false-positive flags may be defined such that a document is flagged as a duplicate if the micr line of the document is the same as another document, if the document has the same date or if the document has the same date and sequence number. A micr line may include a serial number, routing transit number, account number, and/or dollar amount. In one or more arrangements, a false-positive flag may also be defined for flagging documents that are not to be treated as duplicates even if the item sequence numbers are the same. Sequence numbers may be used to identify an order in which documents and items are captured. One of skill in the art will appreciate that different and additional flags may be defined for various other conditions. Once the documents received from the capture site have been processed, the documents may then be forwarded to a master index system and/or to a transaction exchange system where duplicates are detected in step 450.

If, however, it is determined in steps 405 and 410 that the data corresponding to the electronic documents were received from the transaction exchange system and not a capture site, the system may determine whether duplicates were detected in the documents in step 435. If duplicates were detected, the suspected duplicates may be removed from the data file and replaced with substitute documents in step 440. Substitute documents are generally used to balance and reconcile the processing system. For example, substitute documents may be used so that it does not appear as if one or more documents were lost during the processing. The appearance of lost documents may cause irreconcilable errors in the bank's general ledger and/or transaction logs. The substitute documents may, in one or more arrangements, include information indicating that the original document is undergoing further examination and review. Furthermore, different substitute documents may be used to identify suspected duplicate partner documents versus suspected duplicate on-us documents. Once the suspected duplicates have been removed and replaced in step 440, the system may release the data associated with the one or more non-duplicate documents for posting internally or dispatching to external entities in step 445. That is, on-us items may be posted to internal processing and accounting systems while partner items may be transmitted to the responsible entities (e.g., another bank). If, however, in step 435, the system determines that no suspected duplicates were detected in the documents, the data may be released in step 445 without having to remove detected duplicates and insert substitute documents. As such, non-duplicate documents may be processed and released while suspected duplicates undergo further analysis and review.

Suspected duplicates removed in step 440, on the other hand, may be transmitted to a review system for manual reviewing and processing by personnel. In particular, a suspected duplicate and the corresponding alleged original may be transmitted to one or more workstations in electronic format for review. Prior to forwarding the suspected duplicate documents for manual review, the system may, in some instances, reformat the documents into a viewing format compatible with one or more applications used in the manual review process.

Figure 5:
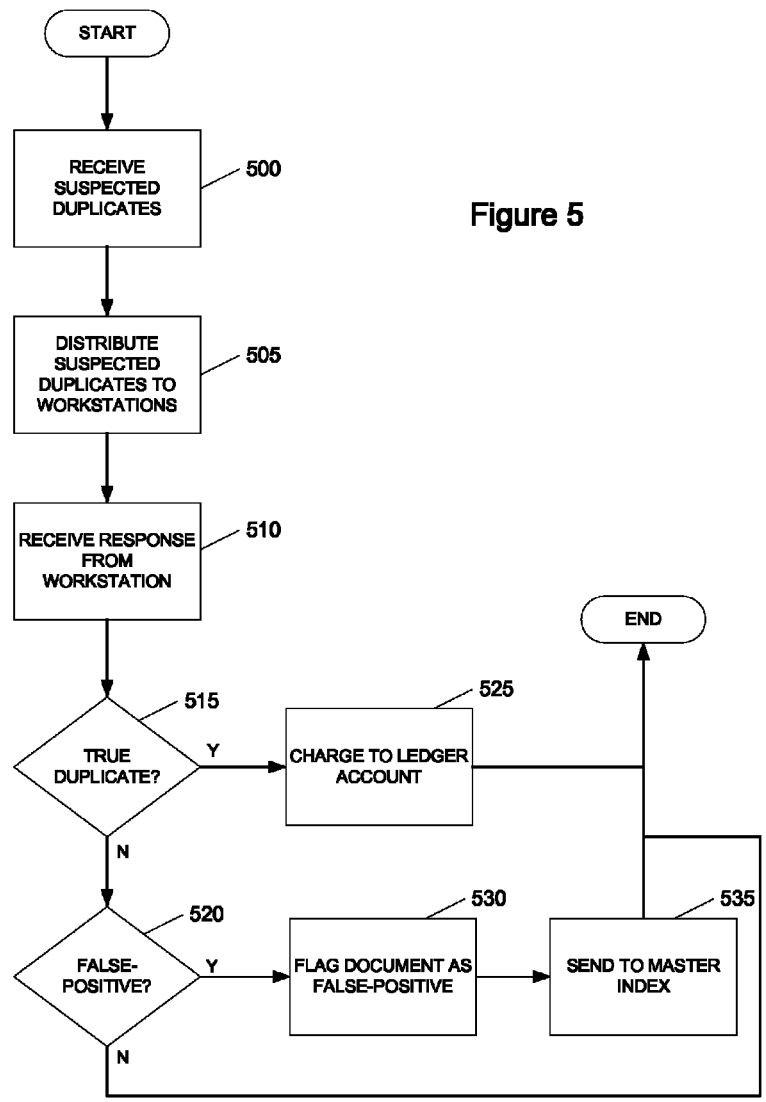
FIG. 5 is a flowchart illustrating a method for evaluating and processing suspected duplicate documents according to one or more aspects described herein.

FIG. 5 is a flowchart illustrating a process for evaluating and processing suspected duplicate documents. In step 500, a duplicate review system may receive one or more suspected duplicates. The suspected duplicates may be received as a single data file or as multiple individual document files. Upon receipt of the suspected duplicates, the system may distribute the duplicate documents to one or more workstations in step 505. The duplicates may be distributed based on a load balancing scheme whereby workstations with low review queues are assigned duplicates ahead of workstations with higher review queues. In step 510, the system may receive a response from a workstation regarding a suspected duplicate. A determination may be made as to whether the response corresponds to a true duplicate determination or a false-positive determination in steps 515 and 520, respectively. If the suspected duplicate is a true duplicate, the suspected duplicate document may be charged to a general ledger suspense account in step 525. A suspense account provides temporary holding of suspected duplicates while they are being resolved. If, on the other hand, the suspected duplicate document is a false-positive, the system may flag or otherwise modify the document so that the document is dispatched or posted in step 530. For example, the system may flag the document as a false-positive allowing the document to bypass the duplicate detector and proceed to posting or dispatching depending on the type of document. Once flagged, the document may then be sent to a master index system for re-processing in step 535.

Figure 6:
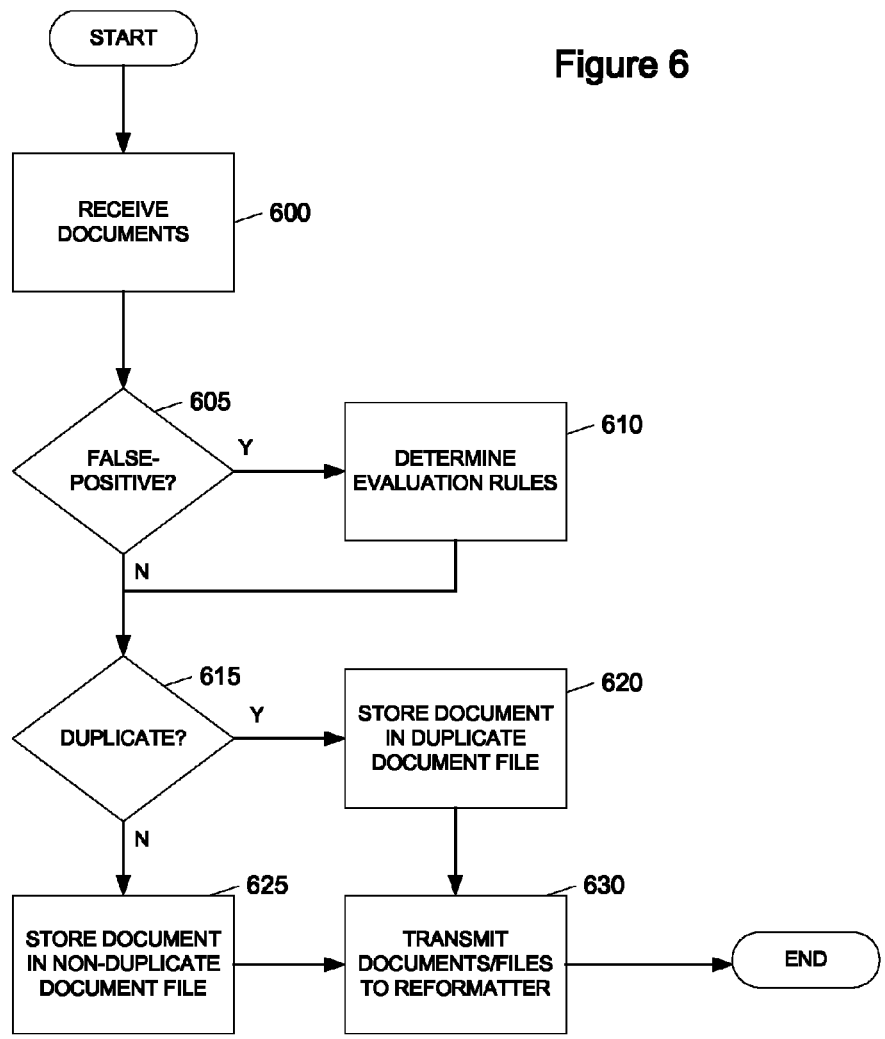
FIG. 6 is a flowchart illustrating a method for identifying duplicates in a set of documents according to one or more aspects described herein.

FIG. 6 illustrates a method for detecting duplicate documents and processing both duplicate and non-duplicate documents. In step 600, a duplicate detection system may receive documents from a reformatter system or an intermediary system. Upon receipt, the system may determine whether the received document is flagged as a false-positive in step 605. If the received document is not flagged as a false-positive, a determination may be made as to whether the received document constitutes a duplicate based on documents stored in the system in step 615. For example, the system may make the determination by comparing a variety of information including item sequence numbers, micr line data, date information, payee/payor information and account information. If, on the other hand, the received document is flagged as a false-positive, the system may determine one or more rules or manners for evaluating whether the document is a duplicate in step 610. For example, a rule may specify that documents marked with a particular false-positive flag should not be treated as duplicates even if an item sequence number matches that of another document. In some instances, a false-positive flag may allow a document to bypass the duplicate detection process. These rules may be applied in determining whether the received document constitutes a duplicate in step 615. By comparing a received document with a repository of documents, a duplicate detection system not only determines duplicates based on documents captured from the same capture site, but also based on documents captured or received from other capture sites and entities. As such, the scope of duplicate detection is expanded.

If a duplicate is detected in step 615, the suspected duplicate document may be stored in a duplicate document file in step 620. Additionally, the alleged original document may be stored in association with the suspected duplicate document or may otherwise be identified in the duplicate document file. If, however, a received document is determined not to be a duplicate, the document may be stored in a non-duplicates file in step 625. The process corresponding to steps 605-625 may be repeated for each document received from the reformatter system. In one or more arrangements, suspected duplicates and non-duplicates may be stored in the same file provided that the suspected duplicates are marked or flagged to differentiate them from the non-duplicates. Once the documents received from the reformatter system have been processed, the duplicates and non-duplicates may then be transmitted to a reformatter system in step 630 for further processing as described herein.

Alternatively or additionally, if no duplicates are detected in a set of documents received from the reformatter system, a transaction exchange system performing the duplicate detection may release the documents for posting and dispatching. For example, a set of documents containing no duplicates may be dispatched to an image cash letter system for preparation and transmission to a responsible entity.

While aspects described herein relate to the collection and processing of documents received from capture sites, documents may also be received at a duplicate detection system from other banking or financial entities. That is, checks drawn on Bank A may be deposited at Bank B, scanned into electronic format by Bank B and transmitted to an electronic receiving center of Bank A. Bank A may then forward the received electronic check to a regional or central processing system for duplicate detection and processing. According to one or more aspects, the electronic receiving center may choose a regional processing system for processing the check based on a registered physical address associated with the check.

Additionally, since duplicate document review and other processes are centralized in a regional or central processing system, documents may be processed independently of when a local capture site's (e.g., bank branch or ATM) hours of operation. For example, many current banking institutions only process transactions up until a certain time of day. As such, customers depositing checks or requesting transfers would be required to wait until the next business day for the transaction to be processed. Using a regional processing system may allow transactions to be processed even when the site at which the transaction was entered has closed. Thus, the efficiency with which documents are processed may be increased significantly.

While illustrative systems and methods as described herein embodying various aspects of the present invention are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for processing financial transactions, the method comprising the steps of:
   receiving, by a document processing system having at least one processor, a document;
   determining, by the document processing system, whether the document corresponds to a potential false-positive duplicate item, wherein said determination is based on characteristics of the document and one or more predefined rules for identifying potential false-positive duplicate items, and wherein said determination is not based on a comparison of the document to one or more other documents;

when the document corresponds to a potential false-positive duplicate item, flagging the document by the document processing system as a potential false-positive duplicate item, wherein flagging the document indicates a manner in which an image of the document is to be analyzed by a duplicate detector, and wherein flagging the document includes selecting a false-positive flag type from a plurality of flag types based on one or more characteristics of the document; and providing the document to the duplicate detector after determining whether the document corresponds to a potential false-positive duplicate item, wherein duplicate detection performed by the duplicate detector differs based on whether the document corresponds to a potential false-positive duplicate item.

2. The method of claim 1, wherein flagging the document includes setting a processing flag associated with the document, wherein the processing flag dictates the manner in which the image of the document is analyzed by the duplicate detector.

3. The method of claim 2, wherein the processing flag corresponds to a pass-through flag.

4. The method of claim 1, further comprising the step of formatting the document into a format compatible with the duplicate detector.

5. A method for detecting duplicate documents, the method comprising the steps of:

receiving, by a duplicate detector system, a financial document;

determining, by the duplicate detector system, that the document has been modified to include a false-positive flag indicating that the document is a potential false-positive duplicate item;

in response to determining that the document has been modified and flagged as a potential false-positive duplicate item, determining, by the duplicate detector system, a manner in which to evaluate whether the document is a duplicate based on a type of the false-positive flag, wherein a first type of false positive flag corresponds to a first evaluation method and a second type of false positive flag corresponds to a second evaluation method different from the first evaluation method, and determining, by the duplicate detector system, whether the document is a duplicate by evaluating at least one information item stored in the document in accordance with the determined manner, wherein a false-positive is different from a duplicate; and in response to determining that the document is not flagged as a potential false-positive duplicate item, determining, by the duplicate detector system, whether the document is a duplicate in a second manner, where the second manner is different from the determined manner and includes evaluating at least one other information item stored in the document.

6. The method of claim 5, wherein the type of the false-positive flag includes at least one of a bypass flag, a micr line flag and an item sequence number flag.

7. The method of claim 5, wherein the type of the false-positive flag is an item sequence number flag and wherein determining whether the document is a duplicate includes determining whether the item sequence number of the received document matches a second item sequence number of another document.

8. The method of claim 5, wherein the step of determining whether the document is a duplicate includes comparing the document with one or more other documents retrieved from a document repository.

9. The method of claim 8, wherein the received document originated from a first capture site and the one or more other documents originated from a second capture site.

10. A document processing system, the system comprising:
a reformatter system,
a duplicate detection system; and
a suspected duplicate review system,
wherein the reformatter system is configured to receive a document and determine whether the document corresponds to a potential false-positive duplicate item, wherein determining whether the document corresponds to a potential false-positive duplicate item comprises determining whether the document contains one or more specific terms, and wherein the reformatter system is further configured to modify the document by setting a flag in the document in response to determining that the document corresponds to a potential false-positive duplicate item, wherein the duplicate detection system is configured to determine whether the document corresponds to a duplicate document after the reformatter system has determined whether the document corresponds to a potential false-positive duplicate item, wherein the duplicate detection system is configured to determine whether the document corresponds to a duplicate document by comparing at least one information item stored in the document with information items stored in one or more other documents, wherein duplicate detection performed by the duplicate detection system differs based on whether the document corresponds to a potential false-positive duplicate item, and wherein the suspected duplicate review system is configured to assign the document to a workstation for review in response to a determination by the duplicate detection system that the document corresponds to a duplicate document.

11. The system of claim 10, wherein the flag dictates a manner in which the duplicate detection system is configured to determine whether the document corresponds to a duplicate document.

12. The method of claim 1, further comprising:
comparing, by the duplicate detector, the document with at least one other document to determine if the document is a duplicate of the at least one other document; and
identifying, by the duplicate detector, the document as a duplicate when the document is determined to be a duplicate of the at least one other document.

13. The method of claim 1, wherein determining whether the document is a potential false-positive duplicate item includes determining whether the document corresponds to at least one of a rebate check or a returned check.

14. The system of claim 10, wherein determining whether the document is a potential false-positive duplicate item includes determining whether the document corresponds to at least one of a rebate check or a returned check.

15. The method of claim 1, wherein determining whether the document corresponds to a potential false-positive duplicate item is based on a previous determination that the document was received from an electronic capture site and not from a duplicate detector.

16. The system of claim 10, wherein determining whether the document corresponds to a potential false-positive duplicate item is based on a previous determination that the document was received from an electronic capture site and not from a duplicate detector.

17. The method of claim 1, wherein determining whether the document is a potential false-positive duplicate item comprises:
   identifying one or more specific terms within the document; and
   determining that the document is a potential false-positive duplicate item based on the identification of the specific terms within the document.

18. The system of claim 10, wherein determining whether the document is a potential false-positive duplicate item comprises identifying one or more specific words within the document indicating that the document is a rebate check.

19. The system of claim 10, wherein determining whether the document is a potential false-positive duplicate item comprises identifying one or more specific words within the document indicating that the document is a returned check.

20. A method for detecting duplicate documents, the method comprising the steps of:
   receiving, by a duplicate detector system having at least one processor, a financial document;
   determining, by the duplicate detector system, that the document has been modified to include a false-positive flag indicating that the document is a potential false-positive duplicate item;
   in response to determining that the document has been modified and flagged as a potential false-positive duplicate item, determining, by the duplicate detector system, a manner in which to evaluate whether the document is a duplicate based on a type of the false-positive flag, wherein a first type of false positive flag corresponds to a first evaluation method and a second type of false positive flag corresponds to a second evaluation method different from the first evaluation method, and wherein the type of the false-positive flag includes at least one of a bypass flag, a micr line flag and an item sequence number flag; and
   determining, by the duplicate detector system, whether the document is a duplicate by evaluating at least one information item stored in the document in accordance with the determined manner, wherein a false-positive is different from a duplicate.

21. The method of claim 20, wherein the type of the false-positive flag is an item sequence number flag and wherein determining whether the document is a duplicate includes determining whether the item sequence number of the received document matches a second item sequence number of another document.

22. The method of claim 20, wherein the step of determining whether the document is a duplicate includes comparing the document with one or more other documents retrieved from a document repository.

* * * * *